United States Patent [19]
Thorson

[11] Patent Number: 5,533,198
[45] Date of Patent: Jul. 2, 1996

[54] DIRECTION ORDER PRIORITY ROUTING OF PACKETS BETWEEN NODES IN A NETWORKED SYSTEM

[75] Inventor: Gregory M. Thorson, Altoona, Wis.

[73] Assignee: Cray Research, Inc., Eagan, Minn.

[21] Appl. No.: 983,979

[22] Filed: Nov. 30, 1992

[51] Int. Cl.$^6$ .................................................. H04J 3/26
[52] U.S. Cl. ........................ 395/200.15; 395/200.1; 395/375; 364/DIG. I; 364/DIG. II; 370/94.1
[58] Field of Search .......................... 395/200, 375, 395/200.15; 370/94.1

[56] References Cited

U.S. PATENT DOCUMENTS

| | | | |
|---|---|---|---|
| 4,933,933 | 6/1990 | Dally et al. | 370/60 |
| 5,008,882 | 4/1991 | Peterson et al. | |
| 5,105,424 | 4/1992 | Flaig et al. | 370/94.1 |
| 5,157,692 | 10/1992 | Horie et al. | 375/38 |
| 5,175,733 | 12/1992 | Nugent | 370/94.3 |
| 5,218,676 | 6/1992 | Ben-Ayed et al. | 395/200 |
| 5,280,474 | 1/1994 | Nickolls et al. | 370/60 |
| 5,333,279 | 7/1994 | Dunning | 395/325 |

FOREIGN PATENT DOCUMENTS

| | | |
|---|---|---|
| 0501524 | 9/1992 | European Pat. Off. . |
| WO88/08652 | 11/1988 | WIPO . |

OTHER PUBLICATIONS

Trunk congestion control in heterogeneous circuit switched networks by Wang et al., 1992 IEEE, pp. 1156–1161.
Introduction to the configurable highly parallel computer by Snyder, IEEE, 1982 publication pp. 310 –319.
An Adaptive and fault tolerant warmhole routing strategy for K–ary n tubes by Linder et al., 1991 IEEE pp. 2–12.
The J. Machine Network by Nuth, IEEE 1992 publication pp. 420–423.
Performance Evaluation of Multicast Warmhole routing in 2D–Tonas Multicomputers by Yang et al., IEEE 1992 p. 173, 178.

IBM Technical Disclosure Bulletin, vol. 35, No. 7, Dec., 1992, New York, US, pp.232–233, "Deadlock–Free Routing Schemes on Multistage Interconnection Networks".
NTC'77 Conference Record, vol. 2, Dec. 5, 1977, Los Angeles, USA, pp. 2821–2825, R. Gallager, "Scale Factors for Distributed Routing Algorithms".
"The Turn Model for Adaptive Routing," C. J. Glass et al., *Computer Architecture News*, vol. 20, No. 2, pp. 278–87, May 1992.

(List continued on next page.)

*Primary Examiner*—Parshotam S. Lall
*Assistant Examiner*—Zarni Maung
*Attorney, Agent, or Firm*—Schwegman, Lundberg, Woessner & Kluth

[57] ABSTRACT

A method of routing messages within an n-dimensional network topology. Two directions are associated with each dimension in the n-dimensional network, for a total of 2n directions. A direction order is assigned which prioritizes the order in which a packet is routed across the 2n possible directions. Such an approach provides deadlock-free, fault tolerant wormhole routing in networks without wrap-around channels. For networks with wrap-around channels, the above method of wormhole routing is enhanced by placing a first direction from each of the n dimensions within a first group of directions. The second direction from each dimension is placed within a second group of directions. A packet to be routed from a source node to a destination node is routed in all relevant directions in the first group of directions in any order before being routed in the second group of directions. If, while traveling in a direction within the first group of directions, the packet is routed across a wrap-around channel, all further routing in that direction must be completed before moving in another direction. Routing then proceeds, if necessary, in the other directions of that first group of directions. Likewise, if, while traveling in a direction within the second group of directions, the packet is routed across a wrap-around channel, all further routing in that direction must be completed before moving in another of the second group of directions. A free hop mechanism is also taught for increase flexibility.

20 Claims, 7 Drawing Sheets

OTHER PUBLICATIONS

"Adaptive low latency, deadlock–free packet routing for networks or processors," J. Yantchev et al., *IEE Proceedings*, pp. 178–186, vol. 136, Pt. E., No. 3, May 1989.

"Deadlock–Free Message Routing in Multiprocessor Interconnection Network," W. J. Dally et al., *IEEE Transactions on Computers*, pp. 547–553, vol. C–36, No. 5, May 1987.

"Performance Analysis of $k$–ary $n$–cube Interconnection Networks," W. J. Dally, *IEEE Transactions on Computers*, pp. 775–785, vol. 39, No. 6, Jun. 1990.

"Virtual–Channel Flow Control," W. J. Dally, Proceedings of the 17th Annual Symposium on Computer Architecture in Seattle, WA, May 28–31, 1990, pp. 60–68.

| NODE | x | y | z | Sx | Sy | Sz | INITIAL JUMP |
|---|---|---|---|---|---|---|---|
| ... | ... | ... | ... | ... | ... | ... | ... |
| 42.15 | 0 | 2 | 1 | − | + | + | +X |
| ... | ... | ... | ... | ... | ... | ... | ... |

FIG. 7

DIRECTION ORDER PRIORITY ROUTING OF PACKETS BETWEEN NODES IN A NETWORKED SYSTEM

FIELD OF THE INVENTION

The present invention pertains generally to the field of high-speed digital data processing systems, and more particularly to a method of routing data within a multiprocessing network which avoids deadlock while increasing fault tolerance.

BACKGROUND OF THE INVENTION

Computer processing speed and efficiency in both scalar and vector machines can be achieved through the use of multiprocessing techniques. By increasing the number of processors and operating them in parallel, more work can be done in a shorter period of time.

Initial attempts to increase system speed and efficiency involved the use of a limited number of processors running in parallel. For instance, an example of a two-processor multiprocessing vector machine is disclosed in U.S. Pat. No. 4,636,942, issued Jan. 13, 1987 to Chen et al. Another aspect of the two-processor machine of the Chen '942 patent is disclosed in U.S. Pat. No. 4,661,900, issued Apr. 28, 1987 to Chen et al. A four-processor multiprocessing vector machine is disclosed in U.S. Pat. No. 4,745,545, issued May 17, 1988 to Schiffleger, and in U.S. Pat. No. 4,754,398, issued Jun. 28, 1988 to Pribnow. All of the above named patents are assigned to Cray Research, Inc., the assignee of the present invention.

As the number of processors in a computing system increase, direct connection and close cooperation between all of the processors becomes impossible. As a result the programming paradigm shifts from multiprocessing to concurrent computing. In a concurrent computer a large number of processors work independently on a pieces of a concurrent program. The processors must still communicate in order to coordinate and share data but they can operate independently on that data. In concurrent computers, communication efficiency becomes critical. Communication latency must be low but at the same time packaging density must be optimized to limit the amount of processor-to-processor interconnect; in addition, it is preferable in some applications to ensure deterministic communication latency.

In response to the need to balance interconnect density against communication latency, a variety of network topologies have been developed. Most such network topologies limit the connections between processors to a relatively small number of neighbors. A large class of such topologies can be characterized as either k-ary n-cubes or as networks such as rings, meshes, tori, binary n-cubes and Omega networks which are isomorphic to k-ary n-cubes. Processors in this class of topologies communicate via a message passing protocol in which information intended for a distant processor is packetized and routed through intermediate processors to the destination processor.

Communication latency in a network such as a k-ary n-cube depends heavily on the choice of routing algorithm. Routing algorithms fall into two categories: store-and-forward routing and wormhole routing. In store-and-forward routing, a message sent from one processor to another is captured and stored in each intermediate processor before being sent on to the next processor. This means that each processor must have a fairly large buffering capacity in order to store the number of messages which may be in transit through the processor. Also, since a message must be received in its entirety before it can be forwarded, store-and-forward approaches to routing result in communication latencies which increase dramatically as a function of the number of nodes in a system. On the other hand, such an approach is amenable to the use of deadlock free algorithms which avoid deadlock by preventing or reducing the occurrences of blocking in message transfers.

In wormhole routing a message is divided into a number of smaller message packets call flits. A header flit is received by a processor and examined as to its destination. The header flit is then sent on to the next processor indicated by the routing algorithm. Intermediate flits are forwarded to the same processor soon after they are received. This tends to move a message quickly through the system. Since, however, each intermediate flit is devoid of routing information, a channel to the next processor is considered dedicated to the message until the complete message is transferred. This results in blocking of other messages which might need to use that particular channel. As more messages block, the system can become deadlocked.

A number of approaches have been offered for resolving the problem of deadlock in wormhole routing. In virtual cut-through routing, messages which are blocked are removed from the network and stored in buffers on one of the intermediate processors. Therefore, blocking in virtual cut-through networks can be avoided through the use of many of the deadlock avoidance algorithms available for store-and-forward routing. Virtual cut-through routing avoids deadlock but at the cost of the additional hardware necessary to buffer blocked messages.

Two alternate approaches for avoiding deadlock in wormhole routing communications networks are described in "Adaptive, low latency, deadlock-free packet routing for networks of processors," published by J. Yantchev and C. R. Jesshope in *IEEE Proceedings*, Vol. 136, Pt. E, No. 3, May 1989. Yantchev et al. describe a method of avoiding deadlock in wormhole routing in which the header flit, when blocked, coils back to the source node. The source node then waits for a non-deterministic delay before trying to send the message again. Yantchev et al. indicate that such an approach is likely to prove very expensive in terms of communications costs and that these costs will likely increase out of proportion as network diameter increases.

Yantchev et al. also propose an improved wormhole routing algorithm which operates to remove cycles in a network channel dependency graph by constraining routing within the network to message transfers within a series of virtual networks lain over the existing communications network. Under the Yantchev method, the physical interconnection grid is partitioned into classes according to the directions needed for message packet routing. In a two-dimensional array of processors, these classes would correspond to (+X, +Y), (−X, +Y), (+X, −Y) and (−X, −Y). Each class defines a particular virtual network; the combination of two of the virtual networks (such as (+X, Y) and (−X, −Y)), along with a suitable deadlock free multiplexing scheme, results in a fully connected network which is deadlock-free. Yantchev et al. teach that the two-dimensional scheme can be extended to an n-dimensional network in which one virtual network is used for increasing coordinates while a second is used for decreasing coordinates. The method of virtual networks can also be extended to include adaptive routing.

The method taught by Yantchev et al. can be used to good effect in avoiding deadlock in mesh networks. The Yantchev approach is not, however, as practical for networks having wrap-around channels, such as tori. Wrap-around channels increase the number of cycles in a network. To eliminate these cycles Yantchev et al. teach that a toroidal network can be decomposed into a fully unwrapped torus equivalent consisting of two or more subarrays. Message passing is then limited to transfers within a subarray.

Such an approach, while breaking the cycles, does so at a relatively high cost. Under Yantchev, a large number of virtual channels must be allocated for each node (eight for an unwrapped two-dimensional toroid) in order to break all possible cycles. As the number of dimensions increase, the number of virtual channels needed for deadlock free routing also increases.

Dimension order, or e-cube routing is yet another wormhole approach to deadlock-free routing. In dimension order routing, an ordering of dimensions is selected and all traffic completes its routing in that order. That is, all routing is completed in one dimension before any routing is allowed in another dimension. This rigid routing scheme provides deadlock free transfers by restricting the types of turns possible in a message transfer (i.e. eliminating cycles in the acyclic mesh). Dimension order routing is described in "Deadlock-free Message Routing in Multiprocessor Interconnection Networks" published by William J. Dally and Charles L. Seitz in *IEEE Transactions on Computers*, Vol. C-36, No. 5, May 1987.

Dimension order routing provides a deterministic routing protocol but, since it only provides a single path between a source and a destination node, in mesh networks this method is not fault tolerant. In toroidal networks, the situation is not much better. In a toroid, you have $2^n$ possible paths but all paths turn on the same n−1 nodes. Because of this, a failure in any node can cut off communication between one or more node pairs.

Each of the communications networks described above suffers limitations in its applicability to network topologies having hundreds or thousands of nodes. There is a need in the art for a communications protocol which resolves the above-mentioned problems in an efficient and hardware limited fashion while achieving low communications latency. It is preferable that such an approach minimize interconnect while providing fault tolerance in message packet transfers.

SUMMARY OF THE INVENTION

To overcome limitations in the art described above and to overcome other limitations that will become apparent upon reading and understanding the present specification, the present invention provides a method of wormhole routing messages within an n-dimensional network topology. Two directions are associated with each dimension in the n-dimensional network, for a total of 2n directions. A direction order is assigned which prioritizes the order in which a packet is routed across the 2n possible directions. Such an approach provides deadlock-free, fault tolerant routing in networks without wrap-around channels.

For networks with wrap-around channels, the above method of wormhole routing is enhanced through sign ordering, that is, by placing a first direction from each of the n dimensions within a first group of directions. The second direction from each dimension is placed within a second group of directions. A packet to be routed from a source node to a destination node is routed in all relevant directions in any order in the first group of directions before being routed in the second group of directions. If, while traveling in a direction within the first group of directions, the packet is routed across a wrap-around channel, all further routing in that direction must be completed before moving in another direction so as to ensure that the particular direction is not entered again. Routing then proceeds, if necessary, in the other direction of that group of directions. Likewise, if, while traveling in a direction within the second group of directions, the packet is routed across a wrap-around channel, all further routing in that direction must be completed before moving in another of the second group of directions.

In another aspect of the current invention, a communications system according to the current invention includes a first hop mechanism by which a message packet can be moved to a neighboring node before being transferred to the destination node in the normal way.

DESCRIPTION OF THE DRAWINGS

In the drawings, where like numerals refer to like elements throughout the several views;

FIG. 7 is a tabular representation of a direction order routing look-up table entry.

DETAILED DESCRIPTION OF THE DRAWINGS

In the following detailed description of the Drawings, reference is made to the accompanying drawings which form a part hereof, and in which is shown by way of illustration a specific embodiment in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. In particular, although the examples given are taken from k-ary n-cubes, it should be apparent that the teachings of the present invention can be applied advantageously to any mesh or toroidal network.

Figure 1:
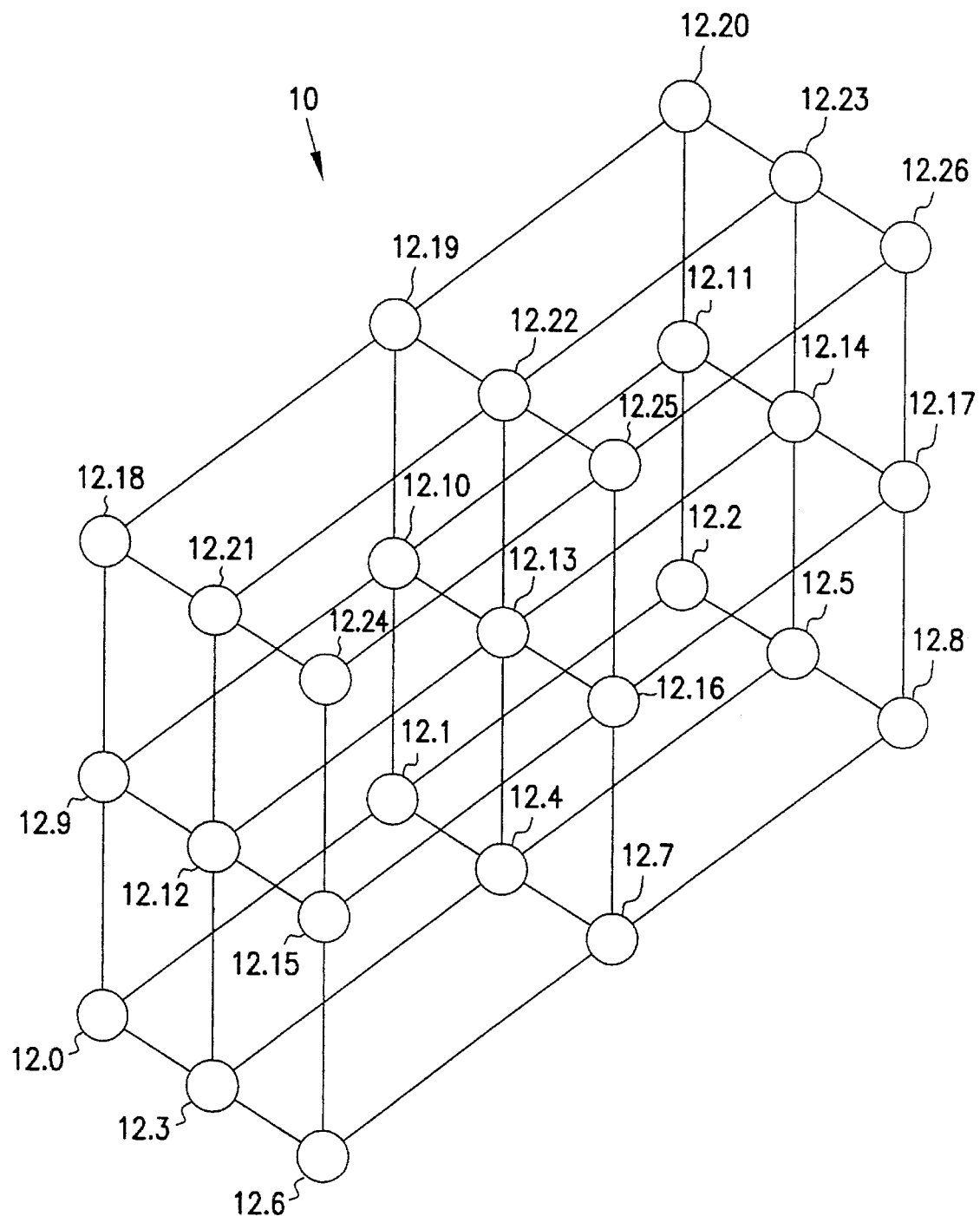
FIG. 1 is a topological representation of a k-ary n-cube network in which k=3 and n=3.

FIG. 1 is a topological representation of a k-ary n-cube network 10 in which k=3 and n=3. Each node 12 of k-ary n-cube network 10 can be one or more processors. Each node processor will typically have its own memory. In one embodiment the node processors can access some shared node memory. In a network such as network 10, where n=3, the three dimensions can be expressed as x, y and z. In FIG. 1, the x dimension is the dimension moving from node 12.0 to 12.1, the y dimension is the dimension moving from node 12.0 to 12.3 and the z dimension is the dimension moving from node 12.0 to 12.9.

Figure 2:
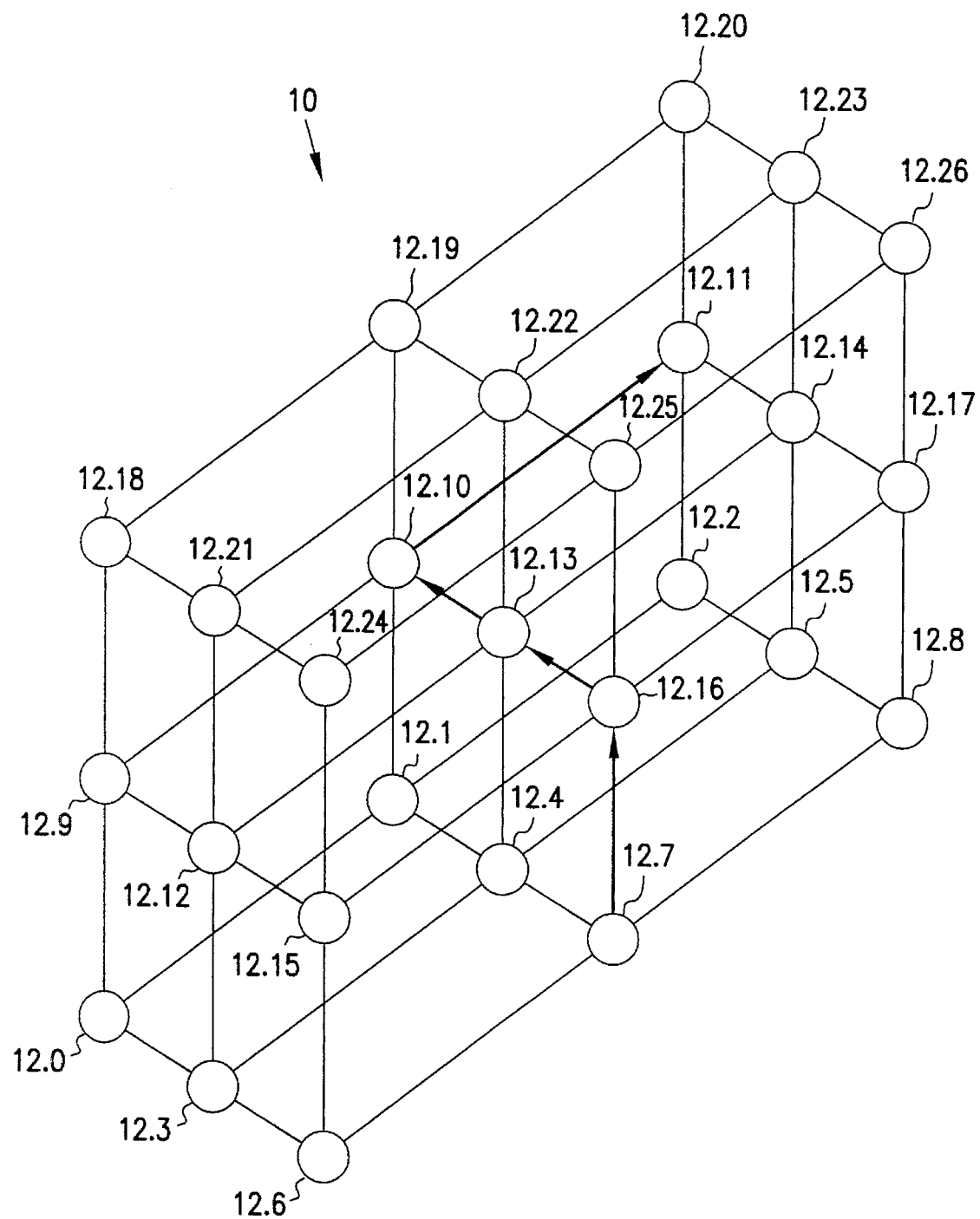
FIG. 2 is a block diagram illustrating dimension order routing in a k-ary n-cube network such as that shown in FIG. 1.

FIG. 2 is a block diagram illustrating dimension order routing in a network such as that shown in FIG. 1. In dimension order routing a network 10 having n=3 is characterized as having three dimensions (labelled x, y and z). For example, in network 10 of FIG. 1, the x dimension could be the dimension moving from node 12.0 to 12.1, the y dimension could be the dimension moving from node 12.0 to 12.3 and the z dimension could be the dimension moving from node 12.0 to 12.9. In dimension order routing, transfer of a message in one dimension (both PLUS and MINUS) is completed before routing is performed in the next higher ordered dimension. For example, a message packet being transmitted from node 12.7 to 12.11 would be analyzed for the routing necessary to move +1 in the x dimension, −2 in the y dimension and +1 in the z dimension. In the example above, if the dimension order is zyx, the message will be transferred from node 12.7 to node 12.16 and then through nodes 12.13 and 12.10 to node 12.11.

As was mentioned previously, dimension order routing provides a deterministic routing protocol but, since it only provides a single path between a source and a destination node, in mesh networks this method is not fault tolerant. In toroidal networks, the situation is not much better. In a toroid, you have $2^n$ possible paths but all paths turn on the same n−1 nodes. Thus a single chip failure at a critical location may make an entire region of the network unreachable to a given processor. It is for this reason that the present direction order routing method was developed.

Figure 3:
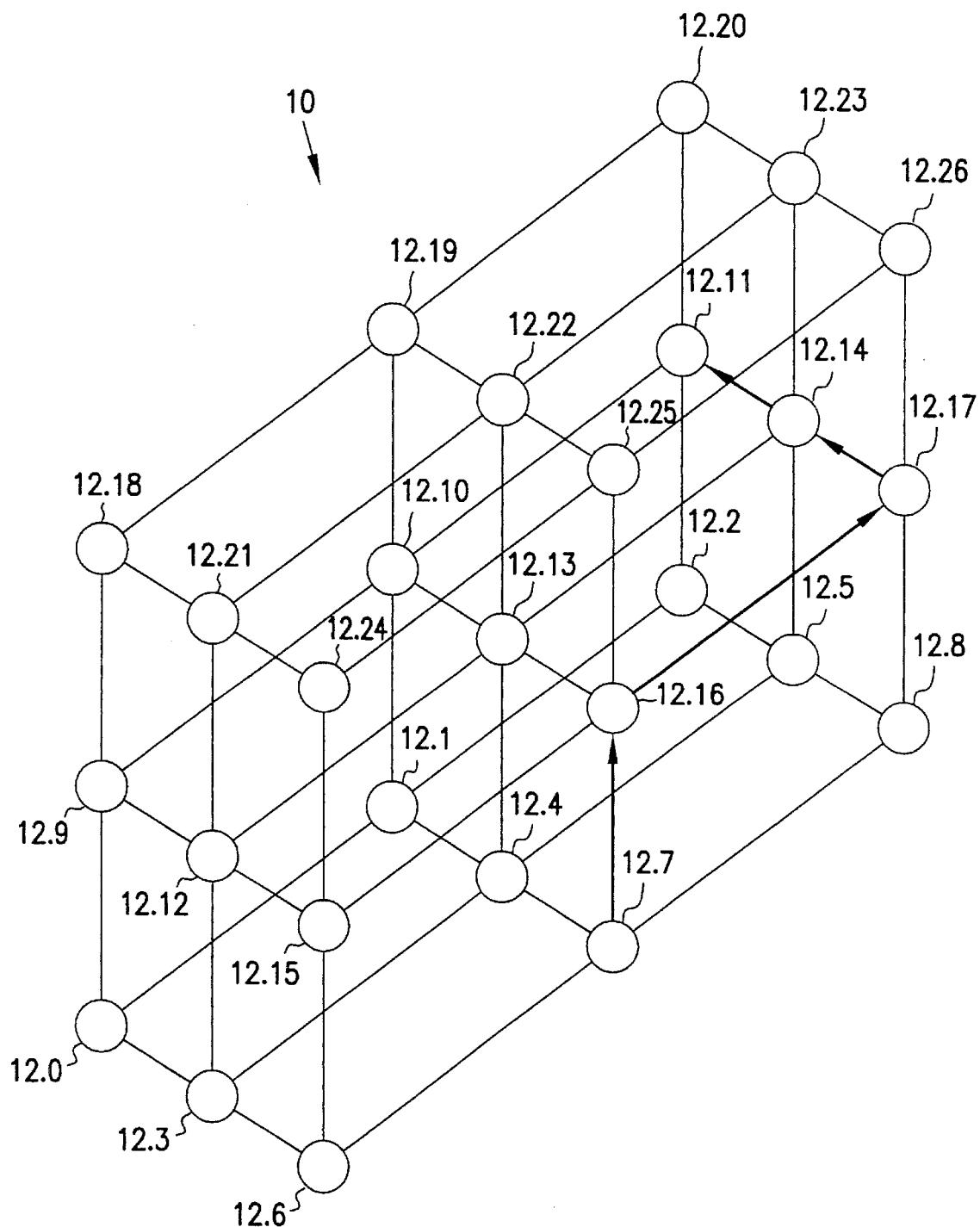
FIG. 3 is a block diagram illustrating direction order routing of a message packet in a k-ary n-cube network such as that shown in FIG. 1.

FIG. 3 is a block diagram illustrating direction order routing of a message packet in a k-ary n-cube network 10. In contrast to dimension order routing, in direction order routing travel in each direction is given a priority with regard to other directions. For instance, one direction ordering for a network such as that shown in FIG. 1 would be to route +x, +z, −x, −y, +y, then −z. Under this routing scheme, a packet which is to be routed in +x, +y, and +z directions will travel first in x, then in z and finally in y. On the other hand, a route of (−x, +y, +z) will travel in first in z, then in x and finally in y.

Another possible routing scheme for a network 10 such as shown in FIG. 3 is to route +x, +y, +z, −x, −y, then −z. In this example, a route of (+x, +y, +z) will travel first in x, then in y and finally in z. On the other hand, a route of (−x, +y, +z) will travel in first in y, then in z and finally in x.

In addition, direction ordering can be varied dynamically to enhance the fault tolerance of the system, as different routes can now have different corners. In this approach, as is shown in FIG. 3, if the direction ordering is (+z, −z, +x, −y, +y, −x), a packet to be transferred from node 12.7 to node 12.11 (i.e. in +x, −y and +z) will be transferred from node 12.7 to node 12.16 and then through nodes 12.17 and 12.14 to node 12.11. If the link between nodes 12.7 and 12.16 is rendered inoperable, communication is still possible simply by changing the direction ordering so as to prevent an initial +z move. If, for example, the direction ordering is chosen to be (+x, +y, −x, +z, −y, −z), the message from node 12.7 to node 12.11 will be transferred from node 12.7 to node 12.8 and then through nodes 12.17 and 12.14 to node 12.11.

On the other hand, if the link between nodes 12.14 and 12.11 is rendered inoperable, communication is still possible simply by changing the direction ordering so as to change the occurrence of the −y move. In that case, the direction order routing method could be chosen as (+x, −y, z, −x, +y, −z) and the packet to be transferred between node 12.7 and node 12.11 will be transferred from node 12.7 to node 12.8 and then through nodes 12.5 and 12.2 to node 12.11.

As in other wormhole routing algorithms, in the preferred direction ordering network embodiment, routing information is transferred as part of the packet. In such an embodiment, node coordinates (either relative or absolute addresses) are part of the header flit. For example, in one embodiment the header flit contains two direction fields for each dimension, for a total of 2n direction fields. Each field contains either an absolute or relative coordinate for movement in a particular direction in that dimension. The direction ordering then defines the order in which the packet is routed in each of the 2n directions. This approach permits flexible routing even in minimal routing schemes.

In another embodiment, the header flit is limited to n dimension fields; in such embodiments, a single absolute or relative coordinate defines movement in the particular dimension. In one such embodiment, the direction to be associated with the dimension field is stored in a separate, related field. In another such embodiment, a sign bit attached to the dimension coordinate indicates the direction to be used in that particular dimension.

The decision between n or 2n fields in the header flit is a design decision. The use of 2n fields provides a great deal of flexibility in routing of a packet but at the cost of carrying an additional n fields in the header flit. For instance, one can route a packet in a round-about way to the destination node in order to avoid faulty communication links. On the other hand, in certain network designs, the n dimension fields may be sufficient to achieve a flexible routing design. It should be apparent that other field assignments, using anywhere from n to 2n fields, could also be used.

Sign ordering can also be used advantageously in some networks. In sign ordering, the 2n directions are divided into two groups of n directions each, with no more than one direction from any dimension in a group. In one embodiment, each direction in a dimension is assigned a sign; directions are then grouped according to sign. Routing within a group may be adaptive or it may be restricted to a given group direction order. (If desired, the group direction order can be the same for both groups.) Routing is then accomplished in the directions contained in the first group before any routing is done in the second group's directions.

In one embodiment of sign ordered routing, it has been found to be advantageous to group all routing of the same sign into the same chip. In such a sign order routing scheme the sign ordering of (+x, +y, +z) and (−x, −y, −z) has one chip per node that does all the positive routes and a second chip per node that does all the negative routes. This particular partitioning scheme has been found to be more fault tolerant than one which partitions according to dimension. The routes (+x, +y, +z) and (−x, −y, −z) both travel in x, y, then z and turn the corners on the same nodes, but different sign corners are turned on different chips and the corners are turned on the chips rather than between the chips.

Direction ordering can be combined with sign ordering to provide great flexibility in routing packets. For instance, a given sign/direction ordering might be (+x, y, +z) and (−x, −y, −z) as given above. On the other hand, packet traffic and/or faulty transmission links may dictate a sign/direction ordering of (+z, +y, +x) and (−x, −z, −y).

Although the preferred direction order network implementation is not adaptive (in order to provide deterministic routing), sign/direction order routing can be used advantageously in an adaptive routing algorithm for networks without wrap-around channels (such as mesh networks). A partition in which all positive paths are routed before any negative paths (or vice versa), has an interesting side benefit of providing a cheap, deadlock free form of adaptive routing. Merely by restraining routing to all positive paths before all negative paths (that is, saying that the directions of the same sign do not have to be satisfied in a fixed order), the network devolves to a variation of the adaptive routing scheme taught by Yantchev et al. above.

Figure 4:
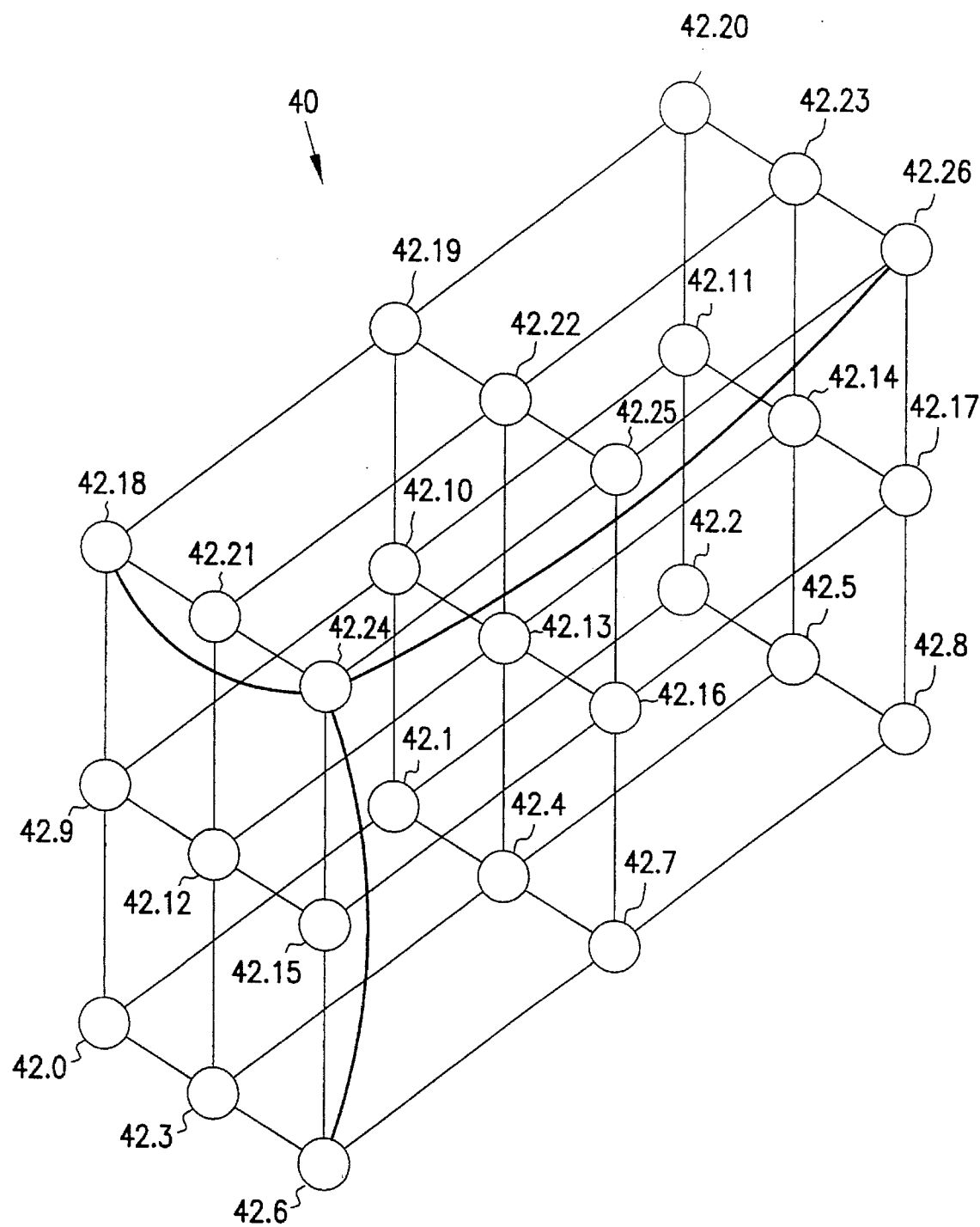
FIG. 4 is a block diagram illustrating a toroidal k-ary n-cube network.

Direction order routing can be extended from mesh to toroidal networks. In toroidal networks, the additional cycles caused by the wrap-around channels can be eliminated by combining direction ordering with virtual channels. The use of virtual channels is described in the Dally et al. article referenced above. In a toroidal network each node of the k-ary n-cube shown in FIG. 1 is connected to six neighbors. In such a network, as is shown in FIG. 4, node 42.24 of network 40 is connected not only to nodes 42.15, 42.21 and 42.25 but also to nodes 42.6, 42.18, and 42.26. The other boundary nodes are connected in a similar fashion (not shown) to other boundary nodes. This type of network topology provides a great deal of flexibility in the routing of messages. A short and a long path is available in each dimension. In a typical system, the short path will normally be used to shorten communication latency. The long path is available, however, for use to compensate for a broken communications link in the short path or to relieve a hot spot in the short path. At the same time, as was discussed previously, the increased number of paths results in an increase in the number of cycles in the network channel dependency graph. The cycles must be eliminated in order to ensure deadlock free packet routing.

In a toroidal network implementation such as that shown in FIG. 4, deadlock free routing is assured according to the present invention by using direction order routing to break the cycles within the acyclic mesh in a flexible manner. As in the examples given above, n to 2n direction fields in the header flit provide the necessary routing information. At the same time, virtual channels are provided for every link between nodes in order to break the cycles introduced by the torus connections. The combination of direction ordering with virtual channels permits flexible deadlock free message routing. In contrast to dimension order routing with virtual channels, the direction ordering approach is inherently more flexible due to the increased number of turning nodes.

In a further refinement of direction ordering in a toroid, sign ordering can be used advantageously with direction ordering to provide additional routing flexibility. In such an approach, a packet could be routed in all relevant directions of a first group of directions before being routed in directions contained in the second group of directions. Such an approach can be extended to an adaptive form of routing in which a packet is routed in any of a first group's directions as long as a wrap-around channel is not crossed. Upon crossing a wrap-around channel, all additional routing within that particular direction must be completed before proceeding to routing within the other directions in the group. It is important to ensure that, once a wrap-around channel is crossed in any one direction, the transfer in that direction is completed and no further routing is permitted in that direction. This limitation ensures that no cycles are created in the torus wrap-around channels.

One embodiment of a sign/direction ordering routing method which can be used in an n-dimensional network topology having 2n directions and including wrap-around channels is described next. In this embodiment, a direction order is defined across all 2n directions. In one such embodiment, the direction ordering is partitioned into two sign groups, with the directions contained in the first sign group having higher priority than any of the second sign group directions.

In order to transfer a packet of information from a source node to a destination node within the network, a header flit consisting of routing information is formed and attached to the information to be transferred. The resulting packet is sent to an adjacent node in one of the directions contained in the first group of directions. The adjacent node forwards the packet in the same or another of the directions from the first group of directions. Transfer continues in the first group of directions until all necessary first group directions have been finished. The packet is then transferred in the necessary second direction group directions. (In one embodiment, once a packet moves in a direction, it is transferred in that direction until finished. It then goes in another direction from the first group of directions until all necessary first group directions have been executed.)

In one such embodiment of a sign/direction ordering routing method, packets are transferred in an adaptive manner in any of the first group directions until a wrap-around channel is crossed. Once a wrap-around channel has been crossed in a particular direction, however, all subsequent transfers in that direction must be completed before adaptive routing can continue in the other first group directions. Adaptive routing can continue for the second group directions, with the same wrap-around channel restriction, when all first group directions have been executed.

Figure 5:
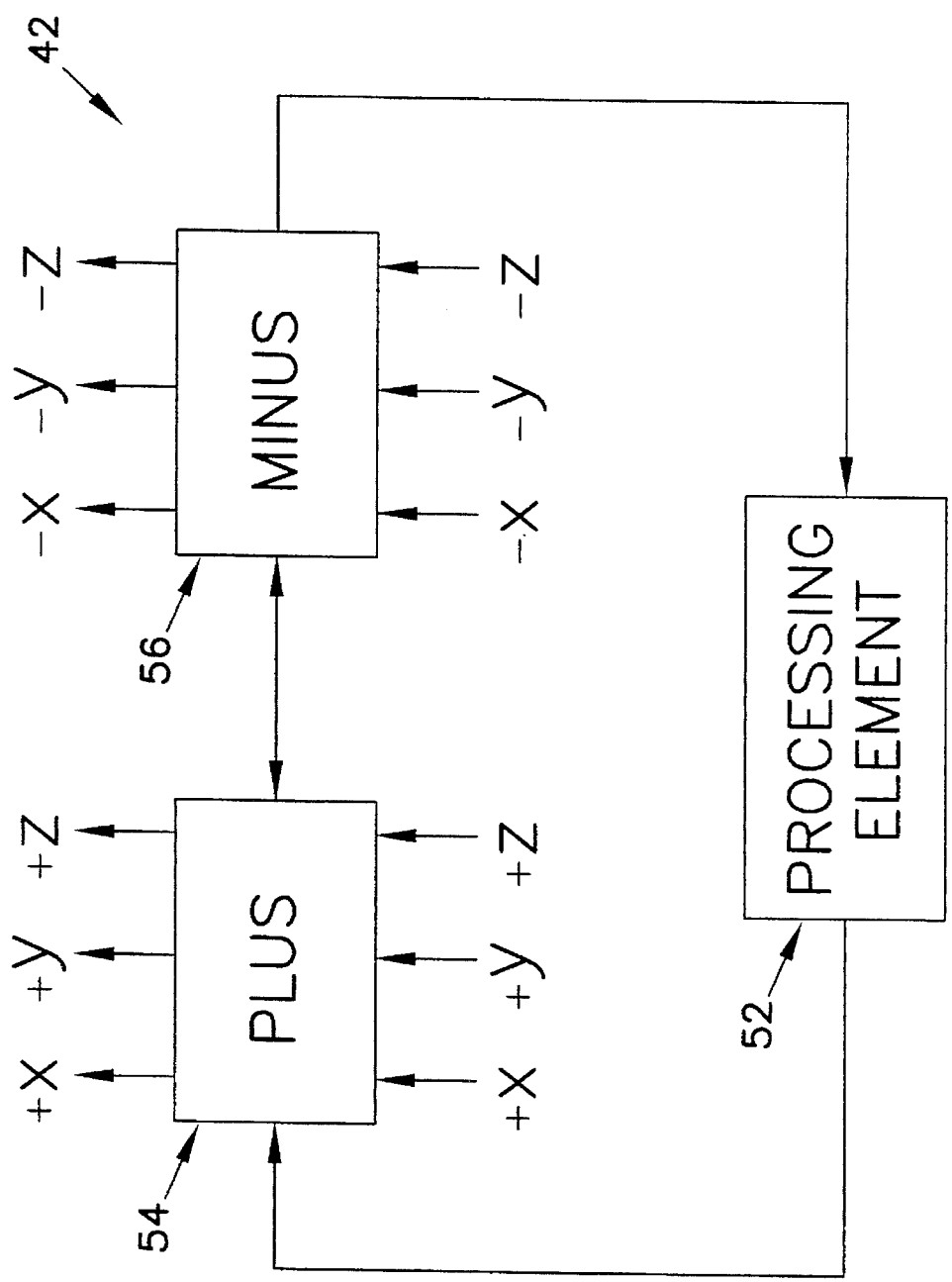
FIG. 5 is a block diagram illustrating a sign-slice partition which can be used with the toroidal k-ary n-cube network of FIG. 4.

A possible hardware implementation of a partition for sign/direction ordering within a k-ary n-cube of n=3, a three dimensional mesh or a three dimensional toroid is illustrated generally in FIG. 5. FIG. 5 is a block diagram of a node 42 for a three dimensional sign/direction ordering routing network partitioned along direction signs. Node 42 consists of a processing element 52 connected to a PLUS pathway 54 and a MINUS pathway 56. Processing element 52 comprises one or more processors connected to one or more node memories.

In the embodiment shown in FIG. 5, PLUS pathway 54 and MINUS pathway 56 establish two independent routing planes. Packets originating at processing element 52 are received by PLUS pathway 54 and sent out the highest priority PLUS path. If the packet is not to be routed in the PLUS direction in any dimension or has completed all PLUS routes, it is transferred from PLUS pathway 54 to MINUS pathway 56 and sent out the highest priority MINUS path. (In one embodiment, packets can be sent out in a PLUS plane and responses to those packets originate on a MINUS plane. In such an embodiment, packets sent in response to a received message packet are sent out on the highest priority MINUS path and all MINUS paths are completed before the response packet is transferred to a PLUS path for the remaining routes.)

In the embodiment of the circuit shown in FIG. 5, processing element 52 selects the path travelled by a message packet by accessing a look-up table stored in node memory. The look-up table lists, for each other node in the system, the path to be taken to the node. Such an approach permits remapping of node locations in order to select alternate travel paths or to logically replace a failed node with a spare node at a different network location. Such remapping can remain transparent to the program sending a message packet; therefore, the look-up table approach permits seamless use of memory throughout the direction order routing network.

In one embodiment, the look-up table can be loaded by the operating system into processor element 52 via a separate network control data path 53. Since it is expected that such a remapping will be required only infrequently, the separate network control data path can be a relatively slow direct data path to each of the processor nodes 52 in each of the nodes 42. The use of a separate data path removes packet routing control from the network and ensures access to all processor elements 52 even in cases of network deadlock.

In one embodiment of the network partition of FIG. 5, a look-up table is implemented which provides for each node in the network both an absolute location and a selected path in each of the dimensions. For instance, node 42.17 in FIG. 4 may have an absolute address of (2, 2, 1) corresponding to x=2, y=2 and z=1. The entries corresponding to node 42.17 in the remaining nodes will provide not only the absolute address of node 42.17 but also a series of sign bits which indicate whether movement in a dimension should be on the PLUS or MINUS plane.

A source node will, before sending a message, access the entry for node 42.17 and construct a header flit consisting of control bits (such as flit size), the sign bits and the absolute address of node 42.17. If, for instance, node 42.18 wants to send a message to node 42.17, it would access the look-up table for the entry corresponding to node 42.17. It would then construct a header flit consisting of the coordinates of the absolute address listed in order of routing priority and the selected paths in each dimension. The header flit will then be forwarded by each intermediate node until it reaches node 42.17.

For example, the shortest path for a message from node 42.18 to node 42.17 can be described by an entry of (−2,−2,−1) in the look-up table at node 42.18. For a order of (+x, +y, +z, −x, −y, −z) this entry would result in a route which began in node 42.18 and traveled through 42.20 and 42.26 to 42.17. (For other direction orderings, the paths would be different but the results the same.) If, however, it was desirable to take a different path on such a transfer, an entry of (−2,+2,−1), for the same direction order, would result in a route which began in node 42.18 and traveled through 42.21, 42.24 and 42.26 to 42.17. Such a longer route might be advantageous for the avoidance of a hot spot or a faulty communications link.

It should be apparent that node 42.17 could, if broken, be replaced by another node in the system. For instance, the operating system may detect that node 42.17 has failed and decide that message packets to node 42.17 will instead be sent to node 42.0. To do this, the operating system will write a new look-up table to each node. The look-up table will contain an entry associated with node 42.17. That entry will be modified so as to replace the node 42.17 coordinates with the coordinates of node 42.0. Subsequently, packets addressed to node 42.17 will be sent to node 42.0 to be acted on. The program sending the message never needs to know that there has been a node failure.

It is also possible to use the look-up table method to further enhance the distribution of message packets. It may be advantageous, for example, to establish a different direction ordering for a packet traveling from node 42.15 to node 42.20 than for a packet traveling from node 42.15 to 42.2. This could easily be done by attaching a direction order field to each entry in the direction order look-up table for node 42.15. Processing element 52 could then attach the prescribed dimension order to the header flit in order to obtain the desired route. (As an alternative, each direction field could be assigned a tag indicating its direction. Processor 52 could then just list the directions in the header flit in the order they are to be routed.)

It should be apparent that a direction order routing network can easily be constructed to use differential or relative addressing rather than absolute addressing to guide the flit through the system. In such an embodiment, each pathway 54 or 56 would decrement the dimension variable before forwarding it to the next node in the dimension. Such an approach requires the calculation of a relative address from each node in the system to all other nodes.

It should be apparent that each flit can be constructed to include one or more error detection or correction bits to avoid errors propagating through the system. Such error control mechanisms are well known in the art; they are useful in spotting and recording errors in data transmission and can be used in connection with a diagnostic program to facilitate mapping around a faulty communications link.

In another embodiment of a routing network according to the present invention, each node which is sourcing a message packet is capable of forwarding the message in any direction and in any dimension. The first node which then receives the message packet routes the message in the applicable direction, sign or sign/direction order. This capability to move a message through an initial "free hop" can be used advantageously to avoid a route in which multiple links are missing. For instance, network 40 in FIG. 6 has inoperable communications links between nodes 42.6 and 42.15 and between nodes 42.15 and 42.24. This means that no matter which direction in z is chosen, a message from node 42.6 cannot get through to node 42.15. In a network which permits initial free hops, a message from 42.6 would initially be sent to another node (such as node 42.3 or 42.7). Routing hardware at the receiving node would then transfer the message to node 42.15 via the normal routing mechanism.

Figure 7:
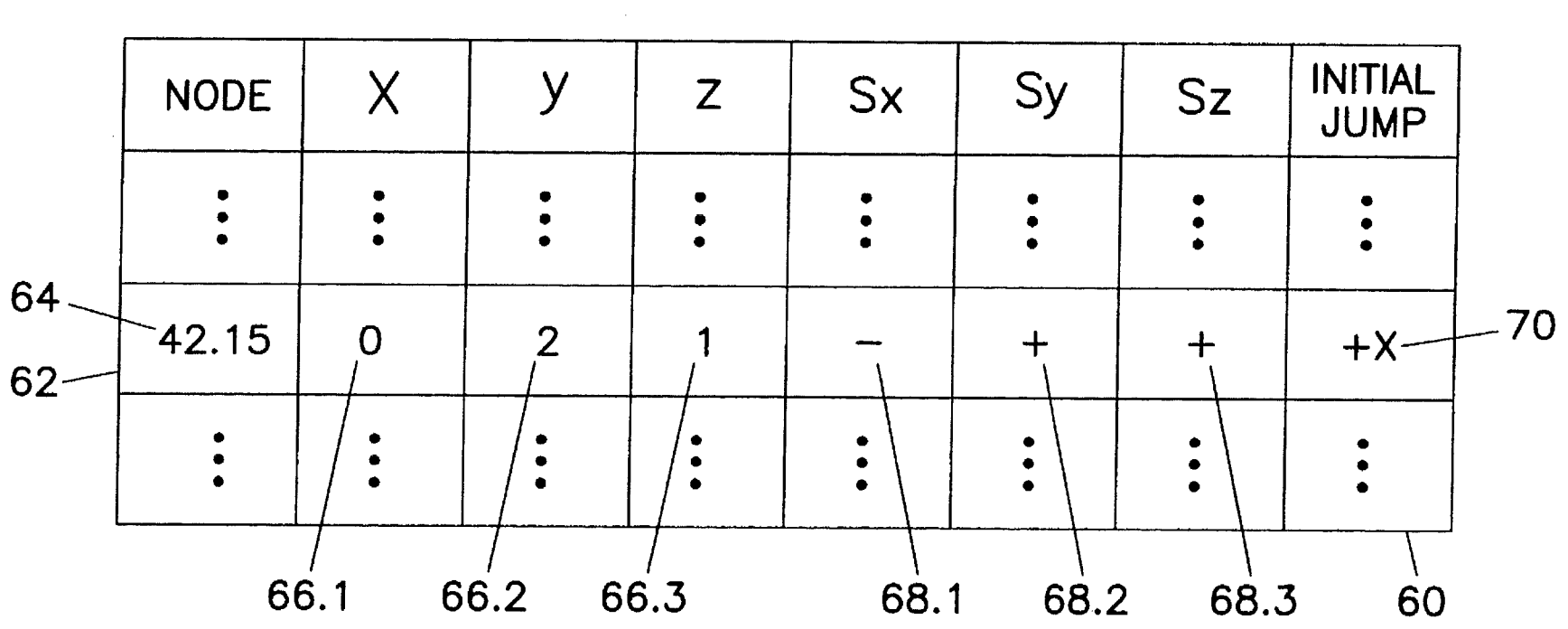

In a typical system, implementation of the "free hop" feature is fairly economical. Only the source node must decide the initial free hop; all intermediate nodes continue to operate according to the direction order or sign/direction order routing algorithm. In the system shown in FIG. 5, a "free hop" location or route could be included in the look-up table as an additional field associated with each entry. Such an entry is illustrated generally in FIG. 7. FIG. 7 is a representation of a look-up table entry incorporating an initial free hop. Look-up table 60 includes one entry for each node in network 40. Each look-up table entry 62 includes dimension locations 66.1–66.3 and sign bits 68.1–68.3 for each of the n possible dimensions. (As was explained earlier, the sign bits indicate whether movement is to be in the PLUS or MINUS direction in a dimension.) The node associated with each entry can be defined by the entry location in the look-up table or through the use of a node designator field 64. In addition, in systems which provide an initial hop, entry 62 includes a free hop designator 70 which indicates the direction of the initial jump.

Figure 6:
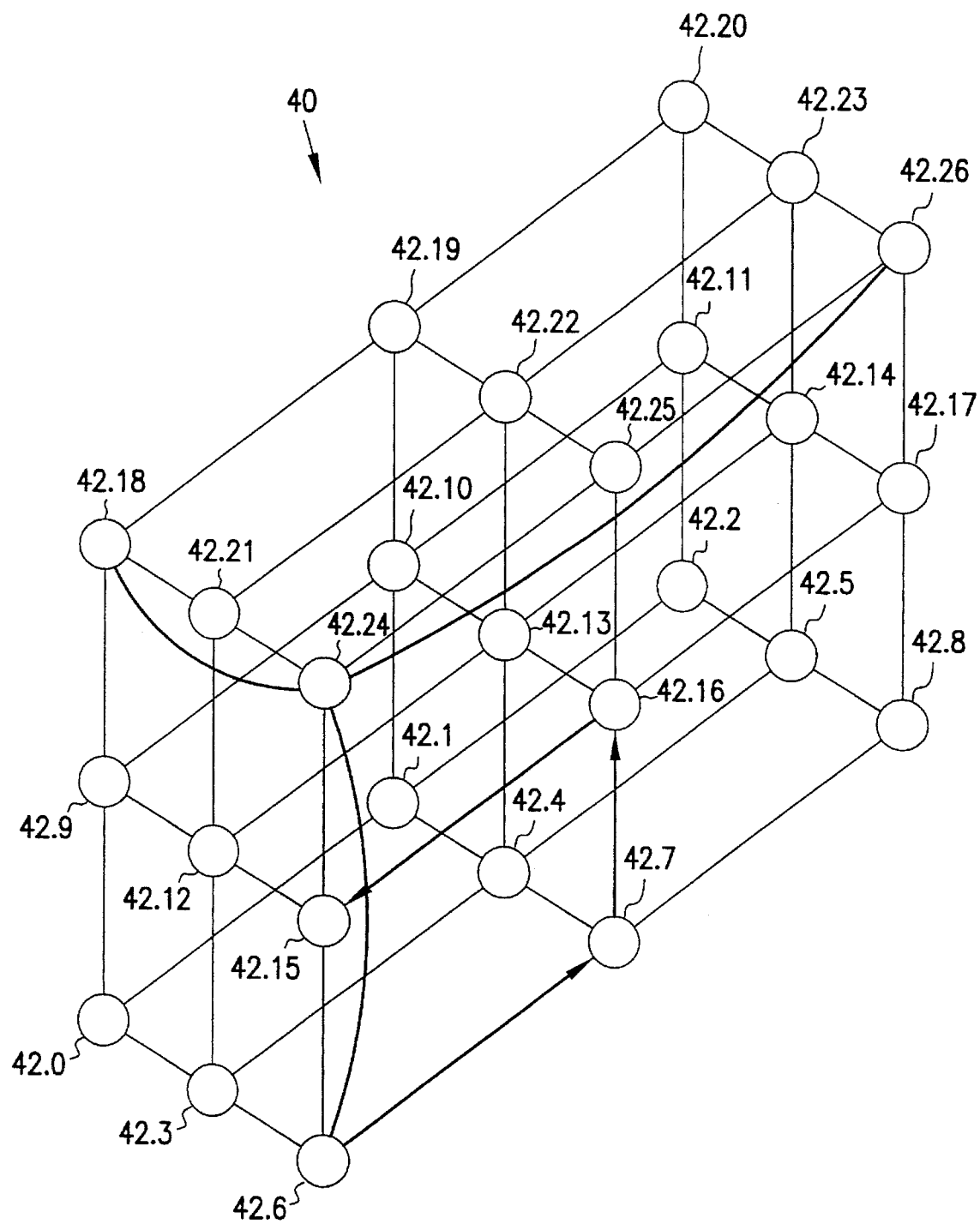
FIG. 6 is a block diagram illustrating direction order routing of a message packet in the presence of failed communication links.

In the example shown on FIG. 6, the look-up table entry 62 for node 42.15 at node 42.6 (as is shown in FIG. 7) could be written as (0,2,1,−,+,+,+x), where free hop designator 70 is +x. Processing element 52 on node 42.6 would create the header flit from the look-up table entry 62 and send the header flit and free hop designator 70 to PLUS pathway 54. PLUS pathway 54 would then, in response to free hop designator 70, simply send the header flit in the +x direction to node 42.7 without even looking at the routing information.

At node 42.7, PLUS pathway 54 would recognize that it was already at +2 in the y dimension and would send the header flit to node 42.16. PLUS pathway 54 at node 42.16 would see that there were no remaining PLUS path transfers and would route the message to MINUS pathway 56 within the same node. MINUS pathway 56 would then forward the message to MINUS pathway 56 of node 42.15 which would then pass the message to its associated processing element 52.

In one embodiment, free hops can be made in any of the 2n possible directions. In a second embodiment, free hops are limited to hops in specific directions. In one such embodiment, free hops can be restricted to the first group of directions in a sign/direction ordering. The number in free hop designator 70 would then simply be the dimension in which the free hop will be taken (e.g. x or y). In a third embodiment, a message packet which begins with a free hop in the PLUS direction in any dimension will continue to be routed in the PLUS direction for any PLUS direction dimensions. In a like manner, a message packet which begins with a free hop in the MINUS direction in any dimension will continue to be routed in the MINUS direction for any MINUS direction dimensions before switching to the PLUS path for the remaining transfers.

In the preferred embodiment, the free hop does not carry any extra information in the header flit (thus the term "free"). In some embodiments, however, it may be advantageous to include a free hop continuation bit in free hop designator field 70. Such a continuation bit could be added to the header flit in order to cause an additional free hop in the same direction in the next node. This might be useful for situations where one would want to skip a node which is itself the source of a great deal of traffic. Such a mechanism would also be useful for skipping over nodes such as spare or I/O nodes which may not map directly into the regular network topology. In another embodiment, it may be advantageous to include other additional information in the header flit to allow a route to use all 2n directions and/or make multiple uses of the same direction.

It is clear that direction order routing provides a flexible deadlock free approach to routing in multi-dimensional networks. It is also clear that sign ordering can be combined advantageously with direction ordering to provide a flexible routing mechanism for toroidal networks. Further, it is clear that free hops can be used advantageously with either direction ordering, sign ordering or both in order to distribute packet traffic expeditiously or in order to avoid failed links. This application is intended to cover any adaptations or variations of the present invention. Therefore, it is manifestly intended that this invention be limited only by the claims and the equivalents thereof.

What is claimed is:

1. A method of routing a packet between a source and a destination node in a networked system having a plurality of nodes connected in an n-dimensional topology, wherein the topology comprises n dimensions, including a first and a second dimension, wherein the system comprises two or more nodes connected in 2n directions to other nodes in the system and wherein the 2n directions comprise first and second directions in each of the n dimensions, the system performing the method comprising the steps of:

defining a direction order for routing packets, wherein the direction order defines a priority for packet routing in each of the 2n directions, wherein the first direction of the first dimension, the second direction of the first dimension, the first direction of the second dimension, and the second direction of the second dimension all have different defined priorities for packet routing;

generating a header comprising routing information, wherein the routing information comprises information needed for routing in each dimension based on the direction order;

attaching the header to information to be transferred in order to form a packet; and transferring the packet from the source node to the destination node, wherein the step of transferring the packet comprises routing the packet in the direction order.

2. The method of routing according to claim 1 wherein the step of transferring the packet further comprises sending the packet in a free hop from the source node to an adjacent node to avoid a route in which multiple links between ones of the plurality of nodes are missing.

3. The method of routing according to claim 1 wherein the step of defining a direction order comprises assigning the first and second directions of the first dimension to a higher priority than the first and second directions of the second dimension in order to ensure that routing of a packet is completed in the first dimension before it is initiated in the second dimension.

4. The method of routing according to claim 1 wherein the step of defining a direction order comprises assigning all first directions to higher priorities than any second directions such that routing of a packet is completed in all first directions before it is initiated in any second direction.

5. The method of routing according to claim 4 wherein the step of transferring the packet further comprises sending the packet in a free hop from the source node to an adjacent node to avoid a route in which multiple links between ones of the plurality of nodes are missing.

6. The method of routing according to claim 5 wherein the step of sending the packet in a free hop from the source node to an adjacent node comprises sending the packet in any one of the first directions.

7. The method of claim 1 further comprising the steps of:

recognizing a network fault in the networked system between two of the plurality of nodes; and redefining the direction order for routing packets, wherein the redefined direction order redefines the priority for packet routing in at least two of the 2n directions to permit routing of the packet around the network fault.

8. A method of routing a packet between a source and a destination node in a networked system having a plurality of nodes connected in an n-dimensional topology having wraparound channels, wherein the topology comprises n dimensions, including a first and a second dimension, wherein the system comprises two or more nodes connected in 2n directions to other nodes in the system and wherein the 2n directions comprise first and second directions in each of the n dimensions, the system performing the method comprising the steps of:

defining a direction order for routing packets, wherein the direction order defines a priority for packet routing in each of the 2n directions, wherein the first direction of the first dimension, the second direction of the first dimension, the first direction of the second dimension, and the second direction of the second dimension all have different defined priorities for packet routing;

generating a header comprising routing information, wherein the routing information comprises information for routing in at least one of the directions in each dimension based on the direction order;

attaching the header to information to be transferred in order to form a packet;

transferring the packet from the source node to the destination node, wherein the step of transferring the packet comprises:

routing the packet in the first directions defined in the routing information according to the direction order, wherein the step of routing the packet in the first directions comprises:
a) routing the packet in one of the first directions defined in the routing information;
b) determining if the packet has crossed one of the wrap-around channels;
c) if the packet has crossed a wrap-around channel in a particular one of the first directions, continuing to route in the particular first direction until all transfers in that particular first direction are completed; and
d) if one or more first directions defined in the routing information have not been routed, going to step a; and routing the packet in the second directions defined in the routing information according to the direction order, wherein the step of routing the packet in the second directions comprises:
e) routing the packet in one of the second directions defined in the routing information;
f) determining if the packet has crossed one of the wrap-around channels;
g) if the packet has crossed a wrap-around channel in a particular one of the second directions, continuing to route in the particular second direction until all transfers in that particular second direction are completed; and
h) if one or more second directions defined in the routing information have not been routed, going to step e.

9. The method of routing according to claim 8 wherein the step of transferring the packet further comprises sending the packet in a free hop from the source node to an adjacent node to avoid a route in which multiple links between ones of the plurality of nodes are missing.

10. The method of routing according to claim 9 wherein the step of sending the packet in a free hop from the source node to an adjacent node comprises sending the packet in any one of the first directions.

11. A networked system comprising:

a plurality of nodes;

an interconnect network interconnecting the nodes in an n-dimensional topology having n dimensions, including a first and a second dimension, the interconnect network connecting two or more nodes in 2n directions to other nodes in the system, the 2n directions including first and second directions in each of the n dimensions;

means for defining a direction order for routing from a source node to a destination node according to a priority in each of the 2n directions, wherein the first direction of the first dimension, the second direction of the first dimension, the first direction of the second dimension, and the second direction of the second dimension all have different defined priorities for packet routing;

means for generating a header having routing information needed for routing in each dimension based on the direction order;

means for forming a packet by attaching the header to information provided by the source node; and means responsive to the routing information in the header to transfer the packet from the source node to the destination node by routing the packet in the direction order.

12. The networked system of claim 11 wherein the means for transferring the packet includes means for sending the packet in a free hop from the source node to an adjacent node to avoid a route in which multiple links between ones of the plurality of nodes are missing.

13. The networked system of claim 11 wherein the means for defining a direction order includes means for assigning the first and second directions of the first dimension to a higher priority than the first and second directions of the second dimension in order to ensure that routing of a packet is completed in the first dimension before it is initiated in the second dimension.

14. The networked system of claim 11 wherein the means for defining a direction order includes means for assigning all first directions to higher priorities than any second directions such that routing of a packet is completed in all first directions before it is initiated in any second direction.

15. The networked system of claim 14 wherein means for transferring the packet includes means for sending the packet in a free hop from the source node to an adjacent node to avoid a route in which multiple links between ones of the plurality of nodes are missing.

16. The networked system of claim 15 wherein the means for sending the packet in a free hop from the source node to an adjacent node includes means for sending the packet in any one of the first directions.

17. The networked system of claim 11 further comprising:

means for recognizing a network fault in the networked system between two of the plurality of nodes; and means for redefining the direction order for routing packets, wherein the redefined direction order redefines the priority for packet routing in at least two of the 2n directions to permit routing of the packet around the network fault.

18. A networked system, controlled by an operating system and comprising:

a plurality of nodes, each node including a look-up table having entries corresponding to each of the plurality of nodes, the entries defining, for each node, a path to be taken to each node from the other nodes;

an interconnect network interconnecting the nodes in an n-dimensional topology having n dimensions, including a first and a second dimension, the interconnect network connecting two or more nodes in 2n directions to other nodes in the system, the 2n directions including first and second directions in each of the n dimensions;

means for generating a header having routing information needed for routing in each dimension from a source node to a destination node by accessing an entry corresponding to the destination node in the source node's look-up table, wherein said entry defines a direction order for routing from the source node to the destination node according to a priority in each of the 2n directions, wherein the first direction of the first dimension, the second direction of the first dimension, the first direction of the second dimension, and the second direction of the second dimension all have different defined priorities for packet routing;

means for forming a packet by attaching the header to information provided by the source node;

means responsive to the routing information in the header for transferring the packet from the source node to the destination node by routing the packet in the direction order; and a network control path connected to each node separate from the interconnect network, wherein the network control path provides a path for the operating system to load the look-up tables.

19. The networked system of claim 18 wherein the look-up table entries corresponding to each node include both an absolute location of the corresponding node and a selected path in each of the n dimensions.

20. The networked system of claim 18 wherein the look-up table entries corresponding to each node include a relative address from each node in the networked system to all other nodes, and wherein the means for transferring the packet includes means to alter the routing information in the header prior to forwarding the packet to the next node in the path from the source node to the destination node.

* * * * *